(12) United States Patent
Yokoyama et al.

(10) Patent No.: US 11,097,673 B2
(45) Date of Patent: Aug. 24, 2021

(54) GROMMET

(71) Applicant: YAZAKI CORPORATION, Tokyo (JP)

(72) Inventors: Satoshi Yokoyama, Aichi (JP); Shinichi Ikeda, Aichi (JP); Akitoshi Kimura, Aichi (JP); Masayoshi Ogawa, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 94 days.

(21) Appl. No.: 16/525,223

(22) Filed: Jul. 29, 2019

(65) Prior Publication Data

US 2020/0070750 A1    Mar. 5, 2020

(30) Foreign Application Priority Data

Aug. 30, 2018 (JP) .............................. JP2018-161961

(51) Int. Cl.
*B60R 16/02* (2006.01)
*H02G 3/22* (2006.01)
*H02G 15/013* (2006.01)

(52) U.S. Cl.
CPC ........... *B60R 16/0222* (2013.01); *H02G 3/22* (2013.01); *H02G 15/013* (2013.01)

(58) Field of Classification Search
CPC ........... H01R 13/5205; H01R 13/5221; H01R 13/74; B60R 16/0222; H02G 3/22; H02G 15/013
See application file for complete search history.

(56) References Cited

U.S. PATENT DOCUMENTS 9,774,129 B2 * 9/2017 Kikuchi ............... H01R 13/641

FOREIGN PATENT DOCUMENTS

JP    2015-154687 A    8/2015
JP    2017-229189 A    12/2017

* cited by examiner

*Primary Examiner* — Hoa C Nguyen
*Assistant Examiner* — Amol H Patel
(74) *Attorney, Agent, or Firm* — Kenealy Vaidya LLP

(57) ABSTRACT

A grommet includes a panel mounting portion to be mounted on a panel having an attachment hole, and an inner member to be assembled to the panel mounting portion and fitted into the attachment hole to lock an edge portion of the attachment hole. The panel mounting portion includes a base portion formed in an annular shape, a seal portion formed on the base portion, and a groove portion formed between the base portion and the seal portion, the groove portion being continuous in a peripheral direction. The inner member includes a restriction piece, which abuts against the edge portion of the attachment hole when the inner member is obliquely fitted into the attachment hole of the panel.

7 Claims, 9 Drawing Sheets

GROMMET

CROSS-REFERENCE TO RELATED APPLICATIONS

This application is based on and claims priority under 35 USC 119 from Japanese Patent Application No. 2018-161961 filed on Aug. 30, 2018, the contents of which are incorporated herein by reference.

TECHNICAL FIELD

The present disclosure relates to a grommet.

BACKGROUND ART

For example, a wire harness routed between a vehicle body and a back door of a vehicle passes through a flexible grommet, and thus a waterproof property of the wire harness is ensured while being protected.

The grommet includes an inner member which locks an edge portion of an attachment hole formed in a panel of the vehicle, and a panel mounting portion mounted on a surface of the panel. A seal portion formed on the panel mounting portion is in close contact with the surface of the panel by locking the inner member to the edge portion of the attachment hole, thereby sealing property is retained (for example, see JP 2017-229189 A).

If the panel mounting portion of the grommet is inclined with respect to the panel when mounting to the panel, the seal portion of the panel mounting portion may be stuck by the edge portion of the attachment hole of the panel. As a result, the seal portion may be damaged, so that sealing property with respect to the panel may be decreased.

SUMMARY OF INVENTION

In view of the above described circumstance, the present disclosure is to provide a grommet capable of preventing a seal portion from being stuck during mounting to a panel to obtain good sealing property with respect to the panel.

According to an aspects of the present invention, it is possible to provide a grommet which prevents the seal portion from being stuck during mounting to the panel, so that good sealing property with respect to the panel can be obtained.

BRIEF DESCRIPTION OF DRAWINGS

FIG. 2A is a side view of the panel mounting portion, and FIG. 2B is a front view of the panel mounting portion.

FIG. 5A is a cross-sectional view of the seal portion before being mounted, and FIG. 5B is a cross-sectional view of the seal portion after being mounted. The term "change" is, for example, intended to mean a deformation state of the seal portion.

FIGS. 6A and 6B are views illustrating a state where the panel mounting portion of the grommet is mounted obliquely to the panel and. FIG. 6A and FIG. 6B are side views of the panel mounting portion when the panel is viewed in cross section.

FIG. 8A is a cross-sectional view of the seal portion before being mounted, and FIG. 8B is a cross-sectional view of the seal portion after being mounted.

FIG. 9A is a cross-sectional view of the seal portion before being mounted, and FIG. 9B is a cross-sectional view of the seal portion after being mounted.

DESCRIPTION OF EMBODIMENTS

Hereinafter, embodiments according to the present invention will be described with reference to the drawings.

Figure 1:
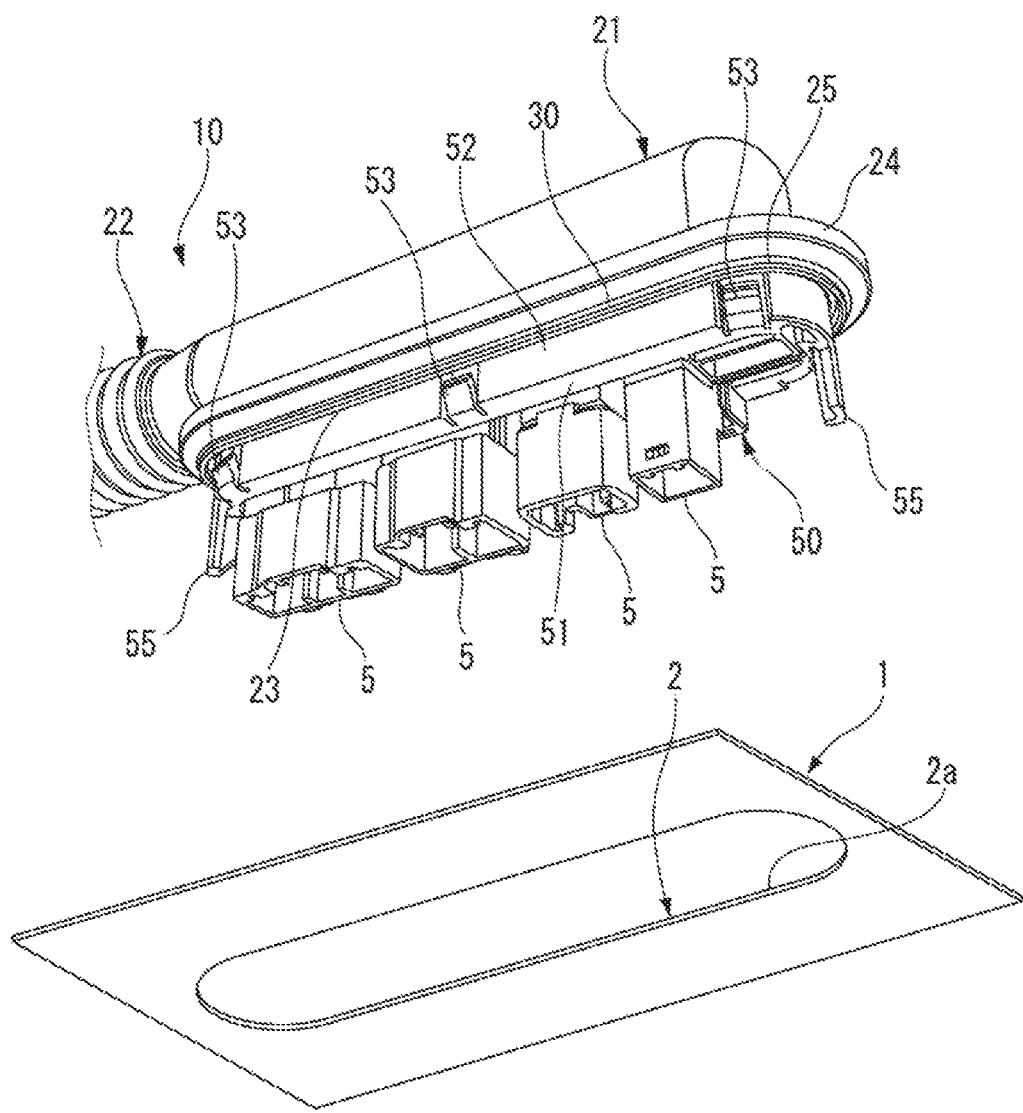
FIG. 1 is a perspective view of a panel mounting portion of a grommet according to the present embodiment.
Figure 2A:
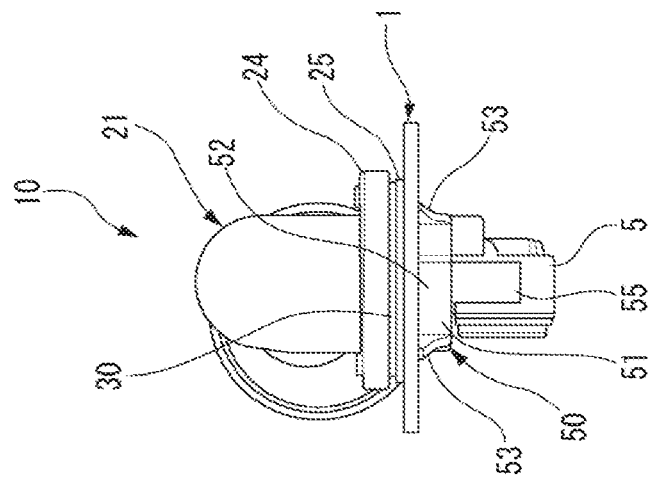
FIGS. 2A and 2B are views illustrating the grommet according to the present embodiment.
Figure 2B:
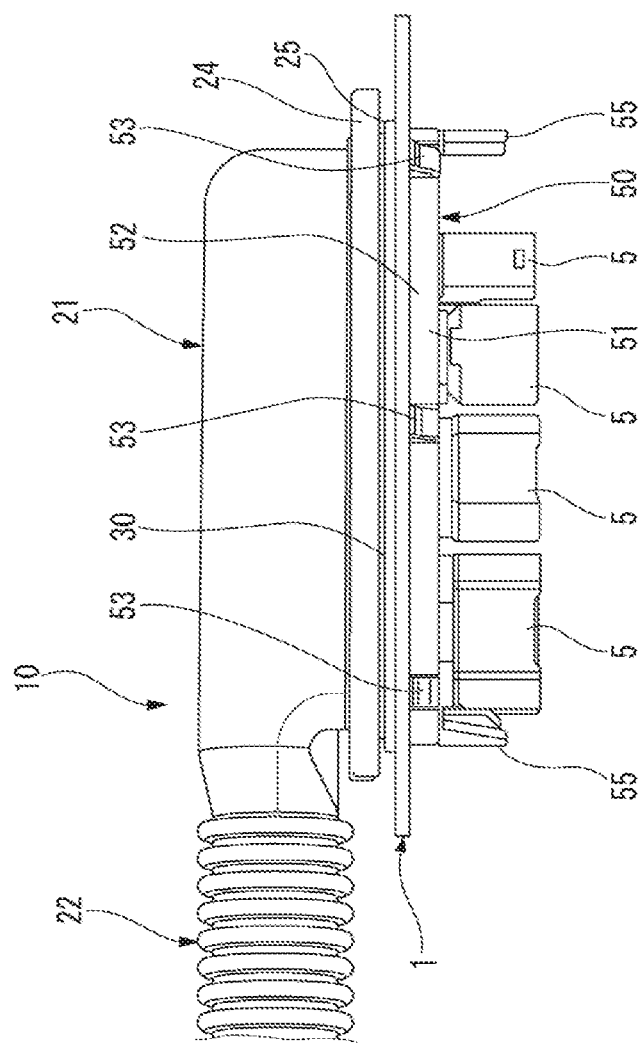
Figure 3:
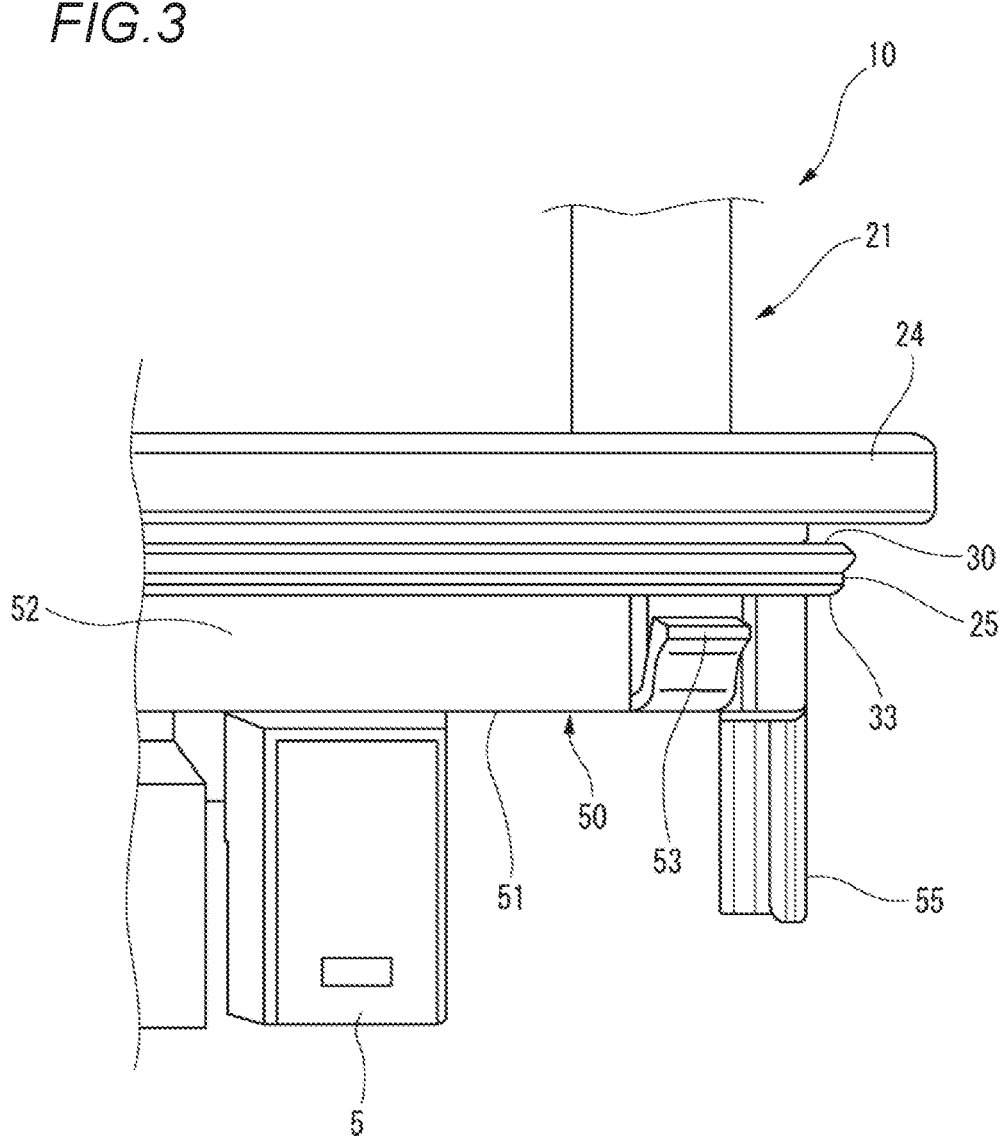
FIG. 3 is a side view of a part of the panel mounting portion of the grommet.

FIG. 1 is a perspective view of a panel mounting portion of a grommet according to the present embodiment. FIGS. 2A and 2B are views illustrating the grommet according to the present embodiment. FIG. 2A is a side view of the panel mounting portion, and FIG. 2B is a front view of the panel mounting portion. FIG. 3 is a side view of a part of the panel mounting portion of the grommet.

As illustrated in FIG. 1 to FIG. 3, a grommet 10 according to the present embodiment includes an inner member 50. The grommet 10 is fitted in and assembled to an attachment hole 2 formed in a panel 1. The grommet 10 is, for example, assembled on a wire harness routed between a vehicle body and a back door in a vehicle to protect and waterproof the wire harness.

The grommet 10 is integrally formed of elastic material which is made of a rubber or the like, and includes a panel mounting portion 21 and a wire insertion portion 22. The panel mounting portion 21 is formed in an elongated shape. The panel mounting portion 21 is formed in a recessed shape having an oval-shaped opening portion 23. The wire insertion portion 22 is formed in a tube shape, and is consecutively installed to one end side of the panel mounting portion 21. The panel mounting portion 21 has an annular base portion 24 at the opening portion 23, and a seal portion 25 is formed on the base portion 24 on a mounting side to the panel 1.

The inner member 50 is integrally molded from a synthetic resin which is made of a plastic or the like. The inner member 50 is formed in an elongated shape, and is fitted and secured to the panel mounting portion 21 from the opening portion 23. In the inner member 50, a portion protruding from the opening portion 23 of the panel mounting portion 21 is a fitting portion 51 having an outer diameter slightly smaller than an inner diameter of the attachment hole 2 of the panel 1, and the fitting portion 51 is fitted into the attachment hole 2. The inner member 50 includes a plurality of locking claws 53 on a peripheral surface 52 of the fitting portion 51. These locking claws 53 lock an edge portion 2a of the attachment hole 2 when the fitting portion 51 is fitted into the attachment hole 2.

The inner member 50 includes bar-shaped restriction pieces 55 at both ends in a longitudinal direction thereof. These restriction pieces 55 are formed on the fitting portion 51 of the inner member 50 on the mounting side to the panel 1, and each of the restriction pieces 55 protrudes forward in a mounting direction A.

Wires (not illustrated) of a wire harness to which the grommet 10 is assembled are inserted through the wire insertion portion 22. Further, connectors 5 connected to an end of each of the wires of the wire harness are secured to the inner member 50. Mating connectors are fitted and connected to these connectors 5.

Figure 4:
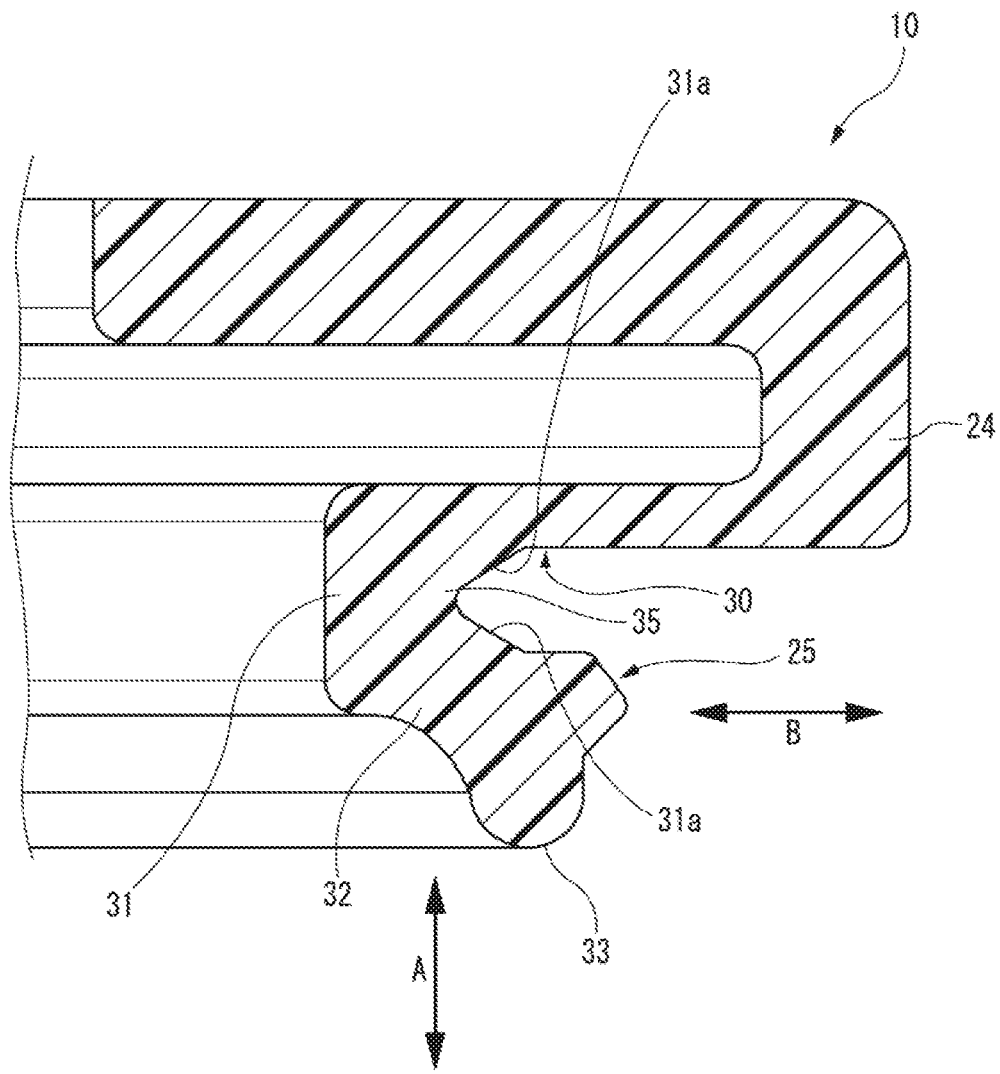
FIG. 4 is a cross-sectional view of the seal portion of the panel mounting portion of the grommet taken along a mounting direction thereof.

FIG. 4 is a cross-sectional view illustrating the seal portion of the panel mounting portion of the grommet taken along the mounting direction thereof.

As illustrated in FIG. 4, the seal portion 25 formed on the panel mounting portion 21 is formed on the mounting side of the base portion 24 with respect to the panel 1. A groove portion 30 continuous in a peripheral direction (continuously provided in the peripheral direction) is formed between the base portion 24 and the seal portion 25. The groove portion 30 is provided outward on the panel mounting portion 21 in a radial direction of the grommet 1 and is formed over the entire periphery.

The seal portion 25 includes a support portion 31, an extension portion 32 and a lip portion 33. The support portion 31 extends forward from the base portion 24 in the mounting direction A to the panel 1. The extension portion 31 extends outward in a radial direction B perpendicular to the mounting direction A from the support portion 31. The lip portion 33 protrudes forward in the mounting direction A from the extension portion 32.

The support portion 31 includes a thin portion 35. The thin portion 35 is formed at a substantially middle portion of the support portion 31 in the mounting direction A. The support portion 31 includes tapered portions 31a on a groove portion 30. The tapered portion 31a is formed in a tapered shape which is inclined outward in the radial direction as being away from the thin portion 35. Accordingly, the support portion 31 is formed in a shape to be narrowed at the thin portion 35, and a thickness thereof is gradually increased as the thickness is positioned toward the base portion 24 and the extension portion 32 with respect to the thin portion 35.

Next, a case where the grommet 10 described above is to be attached to the panel 1 will be described.

Figure 5A:
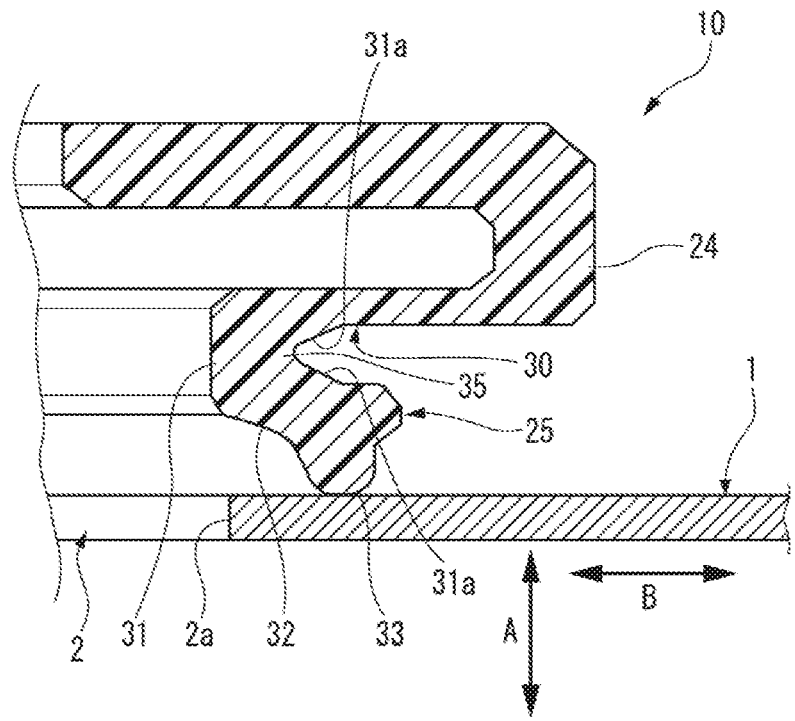
FIGS. 5A and 5B are views illustrating a change of the seal portion when the panel mounting portion of the grommet is mounted to a panel.
Figure 5B:
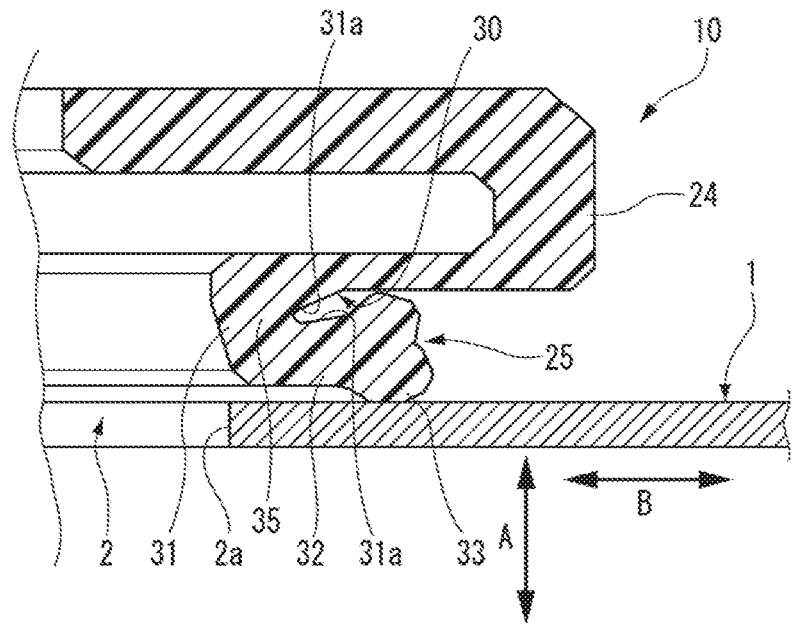

FIGS. 5A and 5B are views illustrating a change of the seal portion when the panel mounting portion of the grommet is mounted to the panel. FIG. 5A is a cross-sectional view of the seal portion before being mounted, and FIG. 5B is a cross-sectional view of the seal portion after being mounted.

In order to mount the grommet 10 to the panel 1, the panel mounting portion 21 of the grommet 10 is brought close to the panel 1, and the fitting portion 51 of the inner member 50 is inserted into the attachment hole 2. Then, as illustrated in FIG. 5A, the lip portion 33 of the seal portion 25 of the panel mounting portion 21 is abutted on a surface of the panel 1.

The panel mounting portion 21 of the grommet 10 is pushed into a panel 1 side from this state. Then, the support portion 31 in the seal portion 25 is bent and crushed at the thin portion 35 formed at the substantially middle portion of the seal portion 25 in the mounting direction A so as to be elastically deformed. For example, the wording "the support portion 31 in the seal portion 25 is bent and crushed at the thin portion 35 is intended to mean that an angle defined between the tapered portions 31a before being elastically deformed is larger than an angle defined between the tapered portions 31a after being elastically deformed". Accordingly, the lip portion 33 moves along the mounting direction A while being abutted with the panel 1.

Further, when the panel mounting portion 21 is pushed to the panel 1, the locking claws 53 of the fitting portion 51 of the inner member 50 lock the edge portion 2a of the attachment hole 2 of the panel 1. Accordingly, the panel mounting portion 21 of the grommet 10 is mounted to the panel 1.

In a state where the panel mounting portion 21 is assembled to the panel 1, as illustrated in FIG. 5B, the lip portion 33 of the seal portion 25 is pressed against the surface of the panel 1 while keeping the state of protruding forward in the mounting direction A, and is brought into close contact with the panel 1 with a large surface pressure. Accordingly, a mounting portion of the grommet 10 with respect to the panel 1 is sealed by the seal portion 25.

The seal portion 25 provided outward on the panel mounting portion 21 of the grommet 10 includes the groove portion 30 which is continuous in the peripheral direction between the base portion 24 and the seal portion 25. Therefore, when the panel mounting portion 21 of the grommet 10 is mounted to the panel 1, the seal portion 25 is easily elastically deformed, so that mounting workability to the panel 1 can be improved.

Figure 6A:
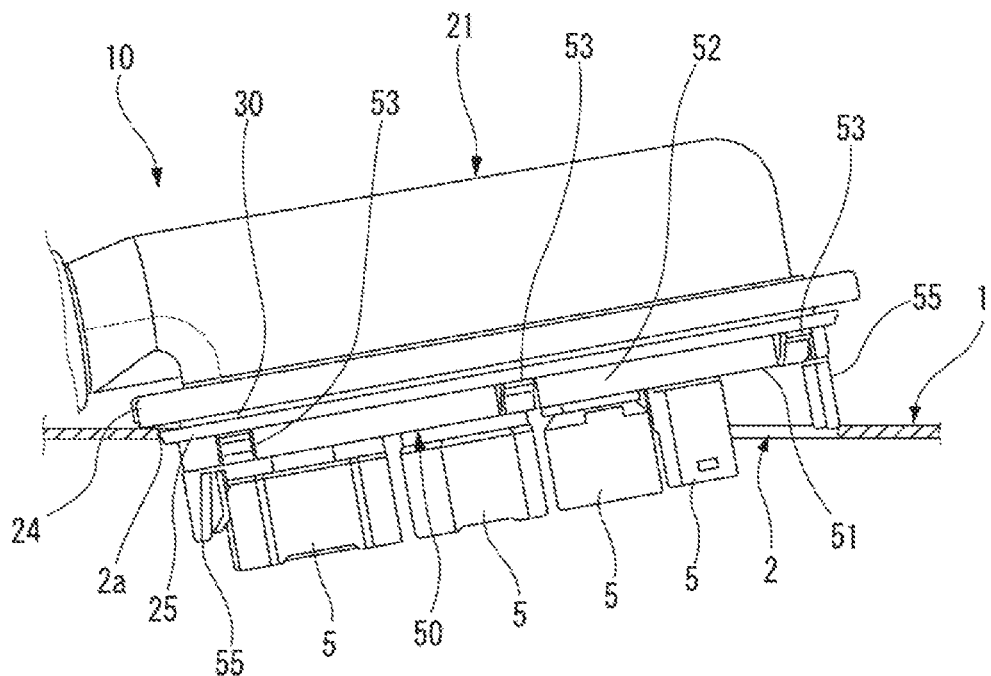
Figure 6B:
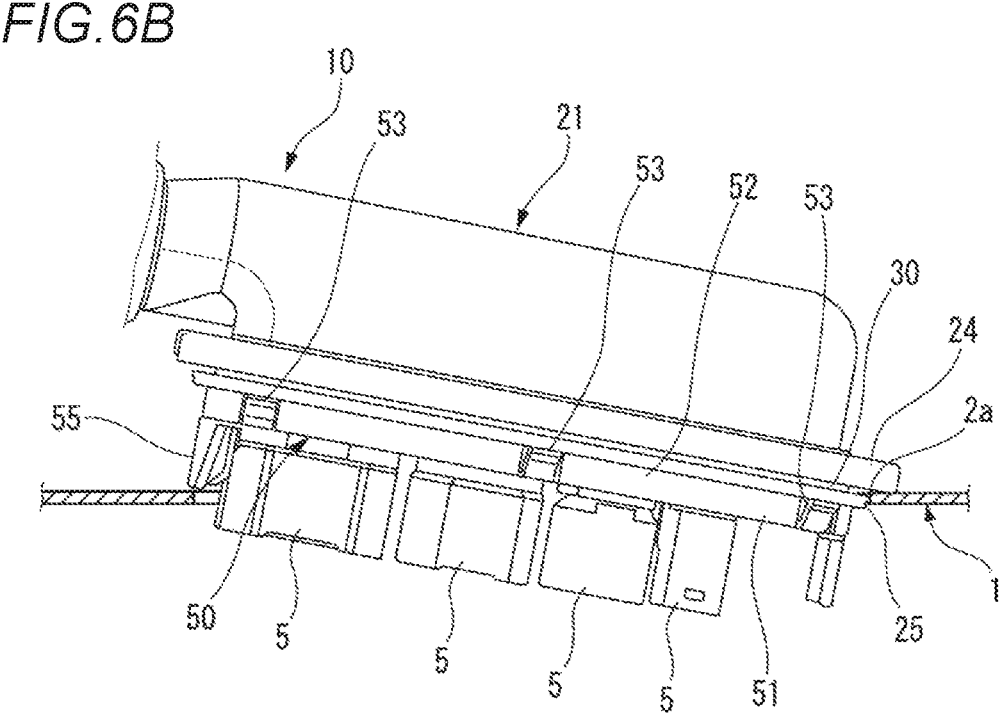

As illustrated in FIG. 6A and FIG. 6B, when the grommet 10 is mounted on the panel 1, if the panel mounting portion 21 of the grommet 10 is inclined with respect to the panel 1, the edge portion 2a of the attachment hole 2 of the panel 1 may enter the groove portion 30, so that the seal portion 25 may be stuck. Further, if the panel mounting portion 21 of the grommet 10 is pushed by forced in this state, the seal portion 25 may be damaged by the edge portion 2a of the attachment hole 2, and the sealing property of the seal portion 25 may be reduced.

In particular, in case where the groove portion 30 continuous over the entire periphery is formed between the base portion 24 and the seal portion 25, the edge 2a of the attachment hole 2 of the panel 1 enters the groove portion 30, and the seal portion 25 is easily stuck.

However, in the grommet 10 according to the present embodiment, when the inner member 50 is fitted obliquely into the attachment hole 2 of the panel 1, the restriction piece 55 of the inner member 50 abuts against the edge portion 2a of the attachment hole 2. More specifically, when one end portion of the inner member 50 in the longitudinal direction is fitted into the attachment hole 2 first and the inner member 50 is inclined with respect to the panel 1, the restriction piece 55 provided on the other end portion of the inner member 50 in the longitudinal direction is abutted on the edge portion 2a of the attachment hole 2. Accordingly, it is possible to prevent the inner member 50 from being fitted to the attachment hole 2 in a state where the inner member 50 is fitted obliquely into the attachment hole 2 and thus the edge portion 2a of the attachment hole 2 enters the groove portion 30. Therefore, damage to the seal portion 25 due to that the seal portion 25 is stuck by the edge portion 2a of the attachment hole 2 can be prevented in advance. Accordingly, the good sealing property obtained by the seal portion 25 can be secured.

In addition, since the rod-shaped restriction pieces 55 protruding forward in the mounting direction A to the panel 1 are formed on the inner member 50, the inner member 50 can be prevented from being obliquely fitted into the attachment hole 2 of the panel 1. That is, the seal portion 25 can be prevented from being damaged while suppressing cost, and good sealing property can be ensured.

Next, various reference examples will be described.

Reference Example 1

Figure 7:
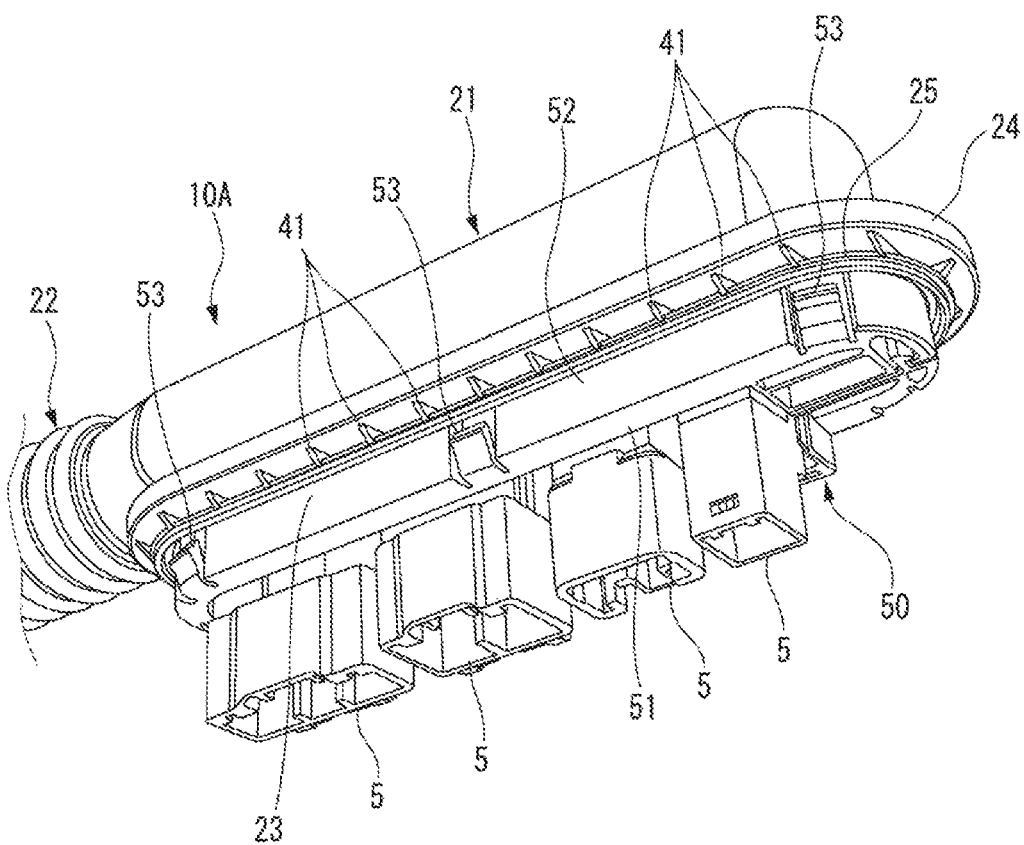
FIG. 7 is a perspective view of a panel mounting portion of a grommet according to reference example 1.

FIG. 7 is a perspective view of a panel mounting portion of a grommet according to reference example 1.

As illustrated in FIG. 7, in a grommet 10A according to reference example 1, a plurality of reinforcing ribs 41 along the mounting direction A are formed between the base portion 24 and the seal portion 25 of the panel mounting portion 21 at intervals in the peripheral direction. According to the grommet 10A, the seal portion 25 is reinforced by the reinforcing ribs 41, so that the surface pressure of the lip portion 33 with respect to the panel 1 can be increased when mounted on the panel 1 and the sealing property can be improved. In the grommet 10A, the seal portion 25 is less likely to be stuck by the edge portion 2a of the attachment hole 2 due to providing the reinforcing ribs 41.

However, since the seal portion 25 in the grommet 10A is difficult to be elastically deformed for being reinforced by the reinforcing ribs 41, a large assembling force is required during mounting to the panel 1, and the mounting operability is reduced.

In contrast, according to the grommet 10 of the present embodiment, since the groove portion 30 which is continuous in the peripheral direction is provided outward, in the radial direction, between the base portion 24 and the seal portion 25, the seal portion 25 is easily elastically deformed when the panel mounting portion 21 is mounted to the panel 1. Therefore, the operability in mounting to the panel 1 can be improved.

Reference Example 2

Figure 8A:
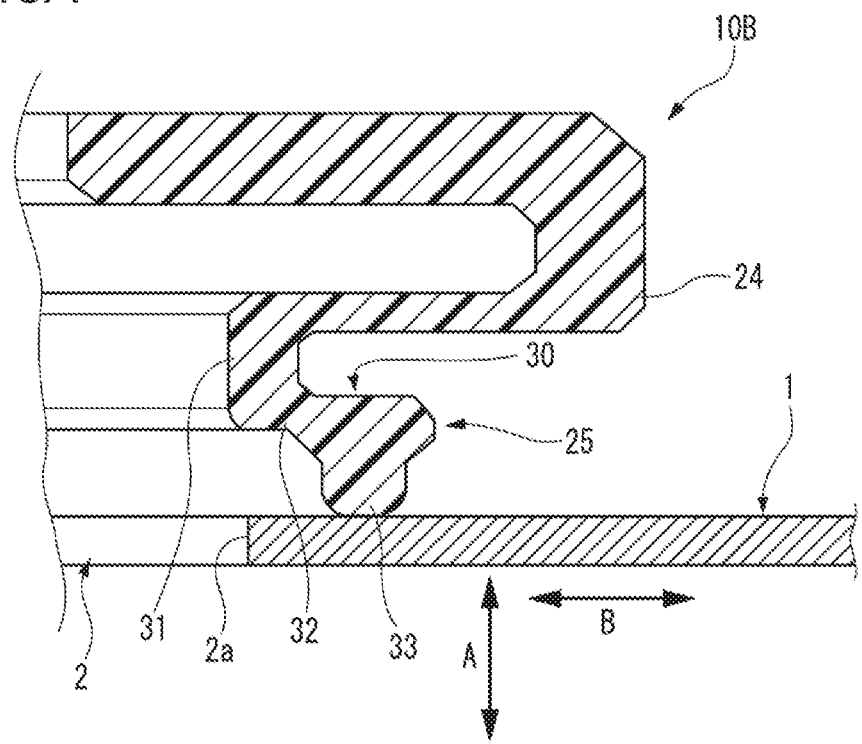
FIGS. 8A and 8B are views illustrating a change of a seal portion when a panel mounting portion of a grommet according to reference example 2 is mounted to a panel.
Figure 8B:
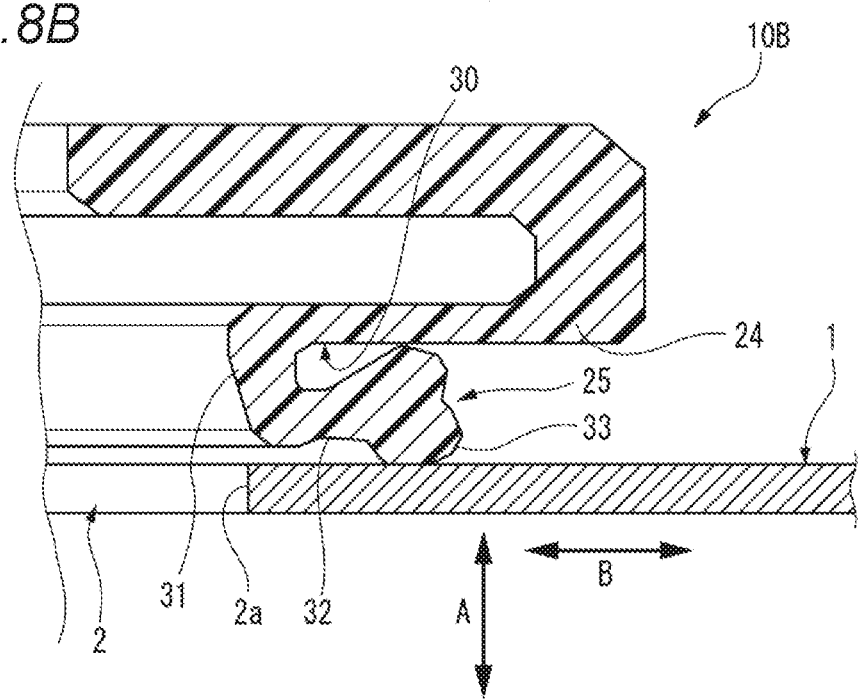

FIGS. 8A and 8B are views illustrating a change of a seal portion when a panel mounting portion of a grommet according to reference example 2 is mounted to a panel. FIG. 8A is a cross-sectional view of the seal portion before being mounted, and FIG. 8B is a cross-sectional view of the seal portion after being mounted.

As illustrated in FIG. 8A, in a grommet 10B according to reference example 2, the support portion 31 of the seal portion 25 does not include the thin portion 35 and has the same thickness along the mounting direction A.

In the grommet 10B, the extension portion 32 is bent at a portion as a fulcrum connecting with the support portion 31 by a bending moment when the lip portion 33 is abutted with the surface of the panel 1. Then, as illustrated in FIG. 8B, the lip portion 33 formed on the extension portion 32 falls down and is largely inclined with respect to the mounting direction A. Therefore, the surface pressure of the lip portion 33 against the panel 1 is reduced, and the sealing property of the seal portion 25 is reduced.

In contrast, according to the grommet 10 of the present embodiment, the support portion 31 of the seal portion 25 is bent and crushed at the thin portion 35 formed in the substantially middle portion in the mounting direction A so as to be elastically deformed, so that the lip portion 33 moves along the mounting direction A while being abutted with the panel 1 without falling down. Therefore, even if the seal portion 25 is not reinforced by the reinforcing ribs 41, the lip portion 33 is pressed against the panel 1 with the large surface pressure and is brought into close contact with the panel 1 with a large contact area, so that good sealing property can be ensured.

Reference Example 3

Figure 9A:
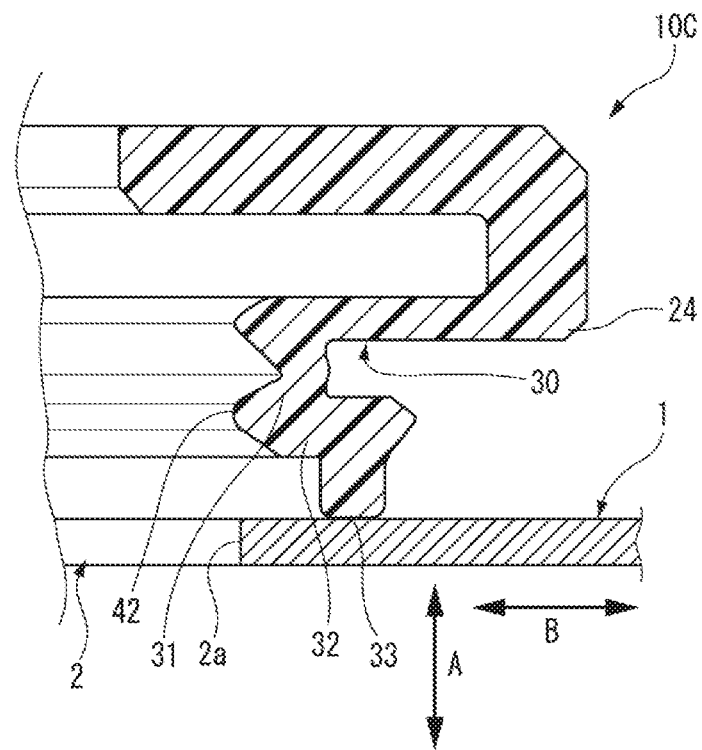
FIGS. 9A and 9B are views illustrating a change of a seal portion when a panel mounting portion of a grommet according to reference example 3 is mounted to a panel.
Figure 9B:
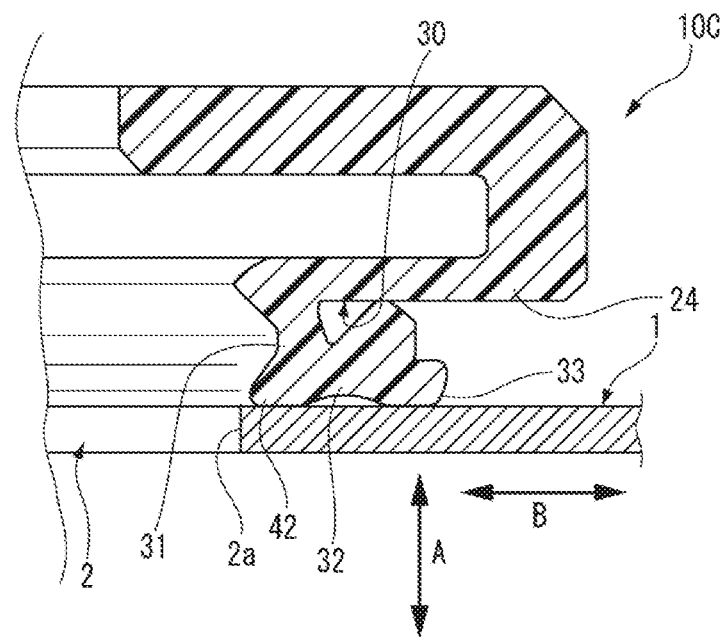

FIGS. 9A and 9B are views illustrating a change of a seal portion when a panel mounting portion of a grommet according to reference example 3 is mounted to a panel. FIG. 9A is a cross-sectional view of the seal portion before being mounted, and FIG. 9B is a cross-sectional view of the seal portion after being mounted.

As illustrated in FIG. 9A, in a grommet 10C according to reference example 3, the seal portion 25 includes a lip portion 42 different from the lip portion 33. The lip portion 42 protrudes in a direction opposite the extending direction of the extension portion 32.

In the grommet 10C, as illustrated in FIG. 9B, the lip portion 33 and the other lip portion 42 are abutted on the surface of the panel 1 when the panel mounting portion 21 is assembled to the panel 1. Accordingly, even if the surface pressure of the lip portions 33, 42 with respect to the panel 1 is small, a good sealing property is obtained by sealing at two places.

However, in the grommet 10C, it is necessary to mold the two lip portions 33, 42 with high dimensional accuracy in order to bring the two lip portions 33, 42 into tightly close contact with the panel 1 in a balanced manner. As a result, the manufacturing cost is increased.

In contrast, according to the grommet 10 of the present embodiment, since the thin portion 35 formed at the middle portion of the support portion 31 in the mounting direction A has a simple shape, a good sealing property can be ensured with one lip portion 33 while reducing the manufacturing cost.

The present disclosure is not limited to the above embodiment, and may be appropriately modified, improved, or the like. In addition, materials, shapes, dimensions, numerals, disposition locations or the like of constituent elements in the above-described embodiment are selectable and not limited as long as the invention can be achieved.

According to an aspect of the present invention, there is provided a grommet that is configured to cover a periphery of a wire harness. The grommet includes a panel mounting portion that is configured to be mounted on a panel having an attachment hole, and an inner member that is configured to be assembled to the panel mounting portion and fitted into the attachment hole to lock an edge portion of the attachment hole. The panel mounting portion includes a base portion that is formed in an annular shape, a seal portion that is formed on the base portion and is configured to be in close contact with a surface of the panel by fitting the inner member into the attachment hole, and a groove portion that is formed between the base portion and the seal portion, the groove portion being continuous in a peripheral direction. The inner member includes a restriction piece that abuts against the edge portion of the attachment hole when the inner member is obliquely fitted into the attachment hole of the panel.

According to an aspect of the present invention, the restriction piece is formed in a rod shape protruding forward in a mounting direction of the inner member to the panel.

According to another aspect of the present invention, the inner member is formed in an elongated shape, and the restriction piece is formed at both ends of the inner member.

According to the aspects of the present invention, the groove portion which is continuous in the peripheral direction is provided outward in the radial direction, between the base portion and the seal portion. Accordingly, when the panel mounting portion is mounted to the panel, the seal portion is easily elastically deformed. Therefore, mounting workability to the panel can be improved.

When the inner member is fitted obliquely into the attachment hole of the panel, the restriction piece of the inner member abuts against the edge portion of the attachment hole. Accordingly, the inner member can be prevented from being fitted into the attachment hole in the state where the inner member is obliquely fitted into the attachment hole and thus the edge portion of the attachment hole enters the groove. Therefore, damage to the seal portion due to that the seal portion is stuck by the edge portion of the attachment hole can be prevented in advance. As a result, good sealing property of the seal portion can be ensured.

According to the aspects of the present invention, since the rod-shaped restriction piece protruding forward in the mounting direction to the panel is formed on the inner member, the inner member can be prevented from being obliquely fitted into the attachment hole of the panel. That is, the seal portion can be prevented from being damaged while suppressing cost, and good sealing property can be ensured.

According to the aspects of the present invention, when one end portion of the inner member in the longitudinal direction is fitted into the attachment hole first and the inner member is inclined with respect to the panel, the restriction piece provided on the other end of the inner member in the longitudinal direction is abutted on the edge portion of the attachment hole. Accordingly, the seal portion can be prevented from being damaged by the edge portion of the attachment hole when the inner member is obliquely fitted to the panel.

REFERENCE SIGNS LIST 1 panel
2 attachment hole
2a edge portion
10 grommet
21 panel mounting portion
24 base portion
25 seal portion
30 groove portion
50 inner member
55 restriction piece
A mounting direction

What is claimed is:

1. A grommet that is configured to cover a periphery of a wire harness, the grommet comprising:
   a panel mounting portion that is configured to be mounted on a panel having an attachment hole; and
   an inner member that is configured to be assembled to the panel mounting portion and fitted into the attachment hole to lock an edge portion of the attachment hole,
   wherein the panel mounting portion includes:
   a base portion that is formed in an annular shape;
   a seal portion that is formed on the base portion and is configured to be in close contact with a surface of the panel by fitting the inner member into the attachment hole; and
   a groove portion that is formed between the base portion and the seal portion, the groove portion being continuous in a peripheral direction,
   wherein the inner member includes a restriction piece that abuts against the edge portion of the attachment hole when the inner member is obliquely fitted into the attachment hole of the panel,
   wherein the seal portion includes:
   a support portion that extends away from the base portion in a mounting direction of the inner member into the attachment hole;
   an extension portion extending away from the support portion in a radial direction that is perpendicular to the mounting direction; and
   a lip portion protruding away from the extension portion in the mounting direction,
   wherein the support portion includes: a thin portion formed at a substantially middle position of the whole length of the support portion in the mounting direction; and tapered portions formed in a tapered shape inclined outward in the radial direction from the thin portion, and
   wherein a thickness of the support portion increases, in the radial direction, from the thin portion towards the base portion and the extension portion which are positioned at both ends of the support portion.

2. The grommet according to claim 1, wherein the restriction piece is formed in a rod shape protruding forward in the mounting direction of the inner member to the panel.

3. The grommet according to claim 1, wherein the inner member is formed in an elongated shape, and the restriction piece is formed at both ends of the inner member.

4. The grommet according to claim 1, wherein the base portion extends past the restriction piece in a longitudinal direction of the grommet.

5. The grommet according to claim 1, wherein in a state where the panel mounting portion is pushed into the panel, the support portion is bent and crushed at the thin portion so as to be elastically deformed, such that the lip portion is brought into close contact with the panel while keeping a state where the lip portion protrudes forward in the mounting direction.

6. The grommet according to claim 5, wherein an angle defined between the tapered portions before being elastically deformed is larger than an angle defined between the tapered portions after being elastically deformed.

7. The grommet according to claim 1, wherein the inner member has a connector configured to connect with an electric wire of the wire harness, and
   wherein a length of the restriction piece in the mounting direction is shorter than a lower end of the connector.

* * * * *